United States Patent [19]

Lee

[11] 4,410,251

[45] Oct. 18, 1983

[54] INTEGRATED ELECTROMECHANICAL CAMERA CONTROL MECHANISM

[75] Inventor: James K. Lee, Pittsford, N.Y.

[73] Assignee: Eastman Kodak Company, Rochester, N.Y.

[21] Appl. No.: 360,491

[22] Filed: Mar. 22, 1982

Related U.S. Application Data

[63] Continuation-in-part of Ser. No. 219,168, Dec. 22, 1980, Pat. No. 4,333,722.

[51] Int. Cl.³ .................... G03B 3/10; G03B 7/087; G03B 9/24
[52] U.S. Cl. ........................... 354/25; 354/49; 354/50; 354/234
[58] Field of Search .................. 354/25, 29, 43, 44, 354/49, 50, 51, 59, 234, 271

[56] References Cited

U.S. PATENT DOCUMENTS 4,134,654 1/1979 Murakami et al. ............ 354/60 R
4,297,018 10/1981 Murakami et al. .............. 354/50

FOREIGN PATENT DOCUMENTS

3003462 8/1980 Fed. Rep. of Germany .

Primary Examiner—Michael L. Gellner
Attorney, Agent, or Firm—Thomas H. Close

[57] ABSTRACT

An integrated electromechanical control mechanism in a photographic camera is fabricated on a ferromagnetic mechanism plate having an electrically insulating coating. An electronic control circuit, electrical conductors, and a planar electromechanical transducer are carried by the mechanism plate. The planar electromechanical transducer includes a magnet mounted on the mechanism plate to form a magnetic gap therewith, and a planar armature mounted on the mechanism plate for movement in the gap in response to an electrical current applied to the armature. The electrical conductors connect the control circuit with the armature of the electromechanical transducer. The ferromagnetic mechanism plate provides a unitary mechanical support for the electrical and mechanical components of the mechanism, and a magnetic flux return path for the electromechanical actuator. The integrated control mechanism is fabricated using a maximum of printed circuit techniques thereby substantially reducing the cost of tooling and assembly.

21 Claims, 11 Drawing Figures

INTEGRATED ELECTROMECHANICAL CAMERA CONTROL MECHANISM

This is a continuation-in-part of U.S. application Ser. No. 219,168 entitled "Method of Controlling Electromagnetic Actuator in a Camera and Actuator Controllable Thereby" filed Dec. 22, 1980 by J. K. Lee, now U.S. Pat. No. 4,333,722.

BACKGROUND OF THE INVENTION

Cross reference is hereby made to U.S. patent application Ser. No. 360,494 entitled "Electromagnetic Actuator Having a Compliant Armature" filed on even date herewith by J. K. Lee.

FIELD OF THE INVENTION

This invention relates to control mechanisms in photographic cameras and more particularly to such control mechanisms including a control circuit and an electromagnetic transducer controlled thereby.

DISCUSSION RELATED TO THE PROBLEM

Modern, professional and advanced-amateur photographic cameras are highly automated, providing a number of automatic features such as sophisticated exposure control, automatic focus, and automatic flash. It is a current goal of camera manufacturers to be able to provide more of these features in the lower priced cameras. One of the limitations on providing many automatic camera functions at a popular price is posed by current camera design practice and camera manufacturing technology.

Presently, camera mechanisms are maufactured mostly from parts produced from complex sheet metal stampings, machined pins, and wound springs mounted on an intricately formed mechanism plate, also produced by a complex sheet metal stamping process. Electromechanical transducers are generally formed by winding fine wire on an iron core. Camera bodies are usually formed as complex injection molded plastic parts requiring highly intricate molds. Camera control circuits are mounted on rigid or flexible circuit boards and include both integrated circuits and printed or hybrid circuits. Discrete electromechanical transducers are connected to the control circuits with wires or flexible connectors. Small indicator lights are located in the viewfinder optics and are also connected to the control circuits by wires or flexible connectors.

Tooling costs for the complex metal stamping dies and plastic molds contribute a major share to the cost of manufacturing the cameras. Even though automated assembly techniques are employed to the maximum extent practicable, some expensive hand assembly is still required. Assembly is complicated by the intricate three-dimensional part relationships in the camera mechanisms and the need to place the electrical circuits and camera mechanism plates in the camera and perform the electrical connections between them. In order to significantly reduce the cost of providing a greater variety of automatic functions in popularly priced cameras, significant departures from present manufacturing techniques and design philosophy must be taken. It was therefore my goal to provide a new integrated manufacturing approach to photographic camera mechanisms, that would break the grip on costs imposed by the high tooling costs for stamping dies and complex cavity molds, and reduce assembly steps largely to those performable by automated assembly equipment.

SOLUTION—SUMMARY OF THE INVENTION

The above-noted problems are solved according to the present invention by providing an integrated electromechanical camera control system constructed on a ferromagnetic mechanism plate having an electrically insulating coating. Electrically conductive patterns are printed on the insulating coating. One or more planar electromechanical actuators having a flat magnet are mounted with respect to the plate to form a magnetic gap therewith, and a planar armature of the type comprising a printed coil on a sheet of insulating material is mounted for movement in the gap. An electrical control circuit is also mounted on the mechanism plate. The printed electrical conductors connect the control circuit with the planar armature of the planar electromagnetic actuator. The ferromagnetic mechanism plate provides a unitary support for the electrical and mechanical elements of the control mechanism, while also providing a magnetic flux return path for the electromachanical actuator. Because printed circuit technology is employed to define the electrical conductors of both the control circuit and the armature, the mechanism is planar and built up in layers, thereby greatly facilitating automatic construction. Since a maximum of printed circuit technology is employed, most of the tooling for the camera control mechanism can be done in computer software using the computer automated design CAD and computer automated manufacturing CAM techniques developed by the electronics industry. With the electrical and the mechanical components integrated on a common unitary substrate, almost the entire camera mechanism can be formed on the mechanism plate and inserted into a simple camera housing to complete the assembly of the camera.

In a preferred embodiment of the invention, the mechanism plate comprises mild steel with a porcelain coating, the electromechanical actuator comprises a shutter/aperture actuator, and the control circuit is an exposure control circuit having a light sensitive element exposed to scene light. In a further embodiment, the planar electromechanical actuator comprises a focus motor and the control circuit is a distance measuring circuit.

BRIEF DESCRIPTION OF THE DRAWINGS

The invention will be described with reference to the accompanying drawings wherein.

DESCRIPTION OF THE PREFERRED EMBODIMENT

Figure 1:
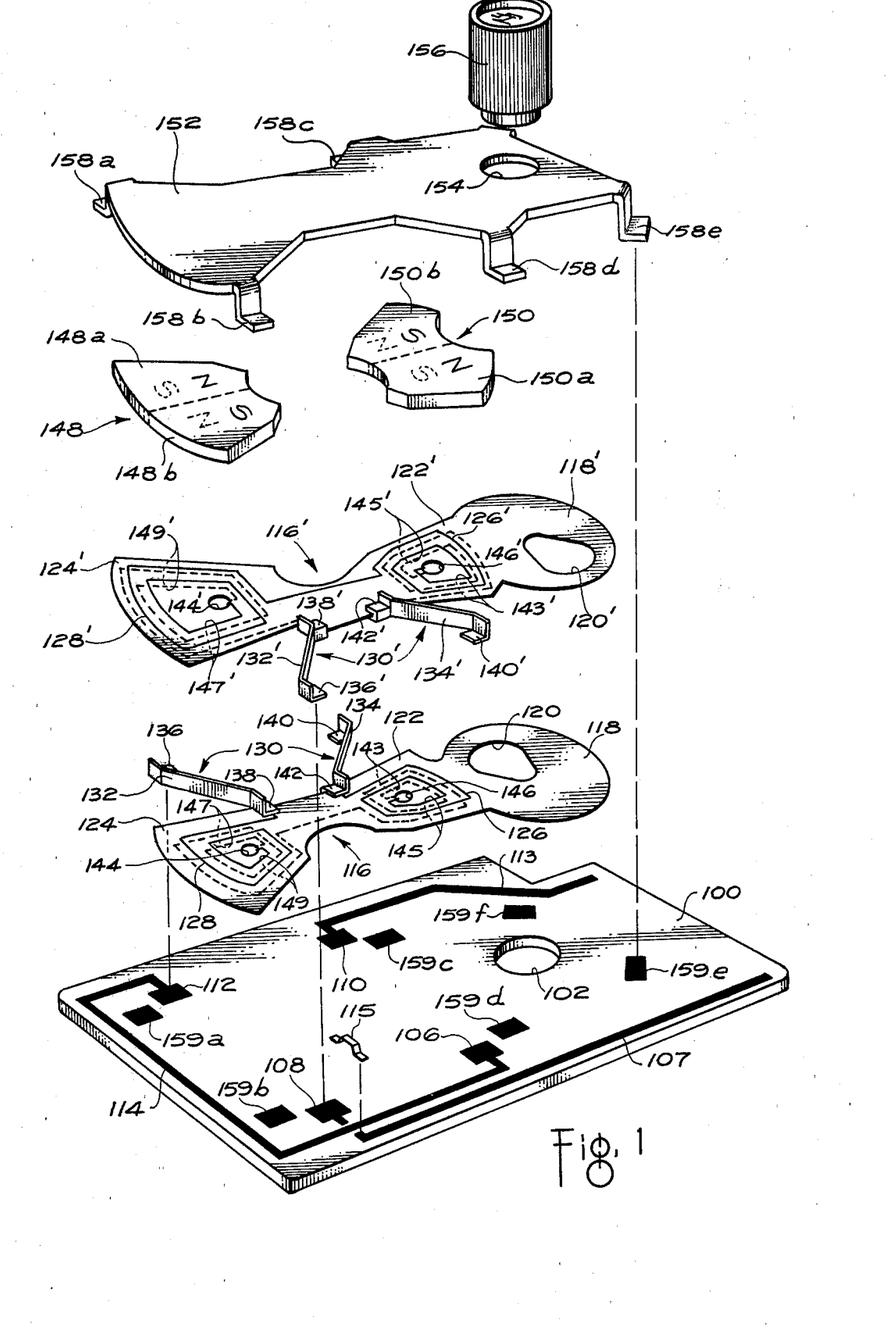
FIG. 1 is an exploded perspective view of an integrated electromechanical camera control mechanism according to the present invention.
Figure 3:
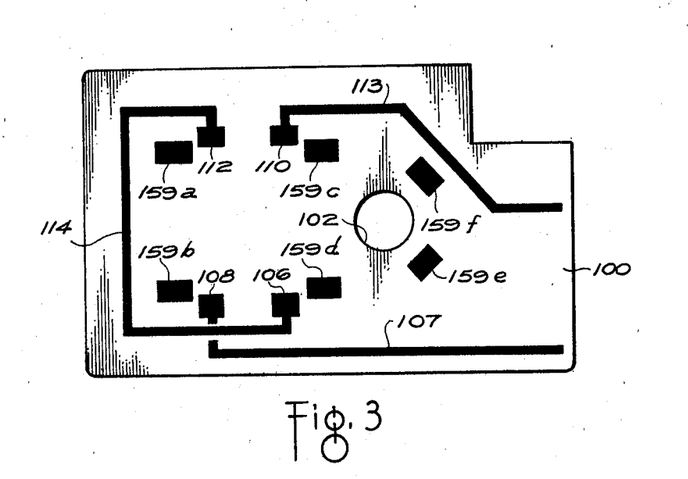
FIG. 3 is a plan view of the conductor pattern printed on the front side of the mechanism plate shown in FIG. 1.

A presently preferred embodiment of the integrated electromechanical control mechanism according to the present invention, is shown in exploded perspective in FIG. 1. The camera control mechanism is supported on a mechanism plate 100 having an aperture 102. The mechanism plate, made from a ferromagnetic material, preferably 24 gauge mild steel, is covered on both sides with a layer of electrically insulating porcelain enamel. Electrical conductors and mounting pads are formed on the surface of the enamel by the process of screen printing a pattern on the enamel using an ink containing a powdered metal, and firing the ink to sinter the powdered metal. The pattern printed on the front side of the mechanism plate is shown in FIG. 3. Conductive mounting pads 108 and 110 are connected to electrical conductors 107 and 113 respectively. Mounting pads 106 and 112 are electrically connected to each other by conductor strip 114. Electrical conductor 107 crosses over conductor 114 by means of a jumper 115 formed from sheet metal and soldered to conductor 107.

The integrated electromechanical control mechanism includes a reciprocating electromechanical actuator having two pivoting planar armatures with two planar coils on each armature. A first armature generally designated 116 includes an aperture blade 118 defining a tapered aperture 120 for progressively uncovering fixed aperture 102, and two coil support portions 122 and 124. Two spiral coils 126 and 128 are formed on the coil support portions 122 and 124 respectively. The armature is formed from 1 to 3 mil thick polyethylene terephthalate film loaded with one micron size particles of carbon to render the film opaque. The armature is about 7 cm long and about 2.5 cm wide at its widest point. The spiral coils are formed on the surface of the armature using photofabrication techniques in the following manner. First, holes are drilled in the film (for example, by laser drilling apparatus) at locations where electrical contacts are to be made from one side of the film to the other. Next, a thin coating of copper (e.g. 1000 to 10,000 angstroms thick) is applied to both sides of the film in an electroless plating bath. A negative photo resist is then applied to both sides of the plated film, and the conductor patterns shown in FIG. 1 are exposed on the top and bottom sides of the film respectively. The resist is then removed in the areas where conductors will be formed and the exposed copper coating is electroplated up to approximately the thickness of the photoresist (about 1 mil).

During this process, the through holes are plated to provide electrical conduction from one side of the film to the other. After the electroplating, the remaining photoresist is removed from the film, and the film is exposed to a mild etchant to remove the thin electroless coating of copper. The finished armature is then cut from the sheet of film (for example, by laser cutting apparatus). This method of manufacturing the armatures was chosen since it is adaptable to treating a continuous web of film. Each step of the process is to be performed at a station positioned along a moving web.

The armature is supported for pivotal movement by a flexure hinge 130 comprising a pair of leaf springs 132 and 134 formed from 2 mil thick beryllium-copper sheet metal. The flexure hinge defines a virtual pivot at the point where the projection of the leaf springs intersect. Leaf spring 132 defines tabs 136 and 138 projecting at right angles from the spring on each end. Tab 138 is bent around the edge of the armature and is soldered to a mounting pad formed at the end of the coil in the armature. Similarly, leaf spring 134 defines tabs 140 and 142 at each end, tab 142 being attached to the armature. Coil 128 starts where leaf spring 132 is connected to the armature and proceeds on the top surface of the armature, as viewed in FIG. 1, counterclockwise in an inward spiral and into a through hole 144 in the center of the coil. The coil emerges on the other side of the armature to continue in a counterclockwise spiral out from the center as shown in dotted lines in FIG. 1. The conductor pattern proceeds across the under side of the armature to the other coil support portion 122 counterclockwise in an inward spiral around support portion 122 to a center through hole 146 and back up to the top surface of the armature. The conductor then defines an outward spiral on the top surface of conductor support 122 ending at the mounting pad for flexure spring 134 where tab 142 makes electrical contact with the coil. As shown in FIG. 1, coil 146 defines two legs 143 and 145 arranged generally radially of the virtual pivot point defined by flexure hinge 130, i.e. generally perpendicular to the direction of movement of the armature. Likewise, coil 128 defines two legs 147 and 149 arranged generally radially of the virtual pivot defined by the flexure hinge 130. Tabs 136 and 140 on the other side of the flexure leaf springs are soldered to mounting pads 112 and 110 respectively. A second armature generally designated 116' is identical to the first armature 116 except that it has been turned over on its back. The parts of armature 116' are numbered similarly to the parts of 116 with primes ('). Tabs 136' and 140' of leaf spring 132' and 134' respectively are soldered to mounting pads 108 and 106 respectively. Preferably, the leaf springs are attached to the mounting pads using the technique of reflow soldering, wherein a sticky paste of powdered solder and flux is applied to the mounting pads, the part to be soldered is positioned, and the contact region is heated causing the solder to flow. Alternatively, a conductive epoxy bonding technique may be employed.

A permanent ceramic magnet 148, approximately 3 mm thick produces a magnetic field in the vicinity of coils 128 and 128'. The magnet 148 is magnetized in a direction perpendicular to its top and bottom surfaces (as viewed in FIG. 1). One half of magnet 148 (designated 148a) is magnetized with the north magnetic pole on the top and the south magnetic pole on the bottom. The other half (designated 148b) is magnetized with the south magnetic pole on the top and the north magnetic pole on the bottom. A second permanent ceramic magnet 150 similar to magnet 148, produces the magnetic fields in the vicinity of coils 126 and 126'. The magnets 148 and 150 are cemented to the under side of a holder 152 made from 24 gauge mild steel.

Holder 152 defines an aperture 154 for mounting taking lens 156. Magnet holder 152 has six mounting tabs 158a-f, for supporting the magnet holder in spaced relation with the mechanism plate 100. The mounting tabs are soldered to mounting pads 159a-f respectively to secure the magnet holder to the mechanism plate and to suspend the magnets over the coils of the armature and form a gap between the magnets and the mechanism plate 100 in which the armatures 116 and 116' reside. Ferromagnetic mechanism plate 100 provides a magnetic flux return path for the magnets, thereby effectively confining the magnetic field to the gap.

To reduce static friction between the armatures and the sides of the magnetic gap, and to provide electrical insulation for the conductors on the armatures, the armatures are coated with a thin layer of Teflon (polytetrafluoroethylene) plastic in the form of spray paint. Alternatively, the armatures may be separated by thin sheets of Teflon plastic interposed between the armatures and between the armatures and the sides of the gap and attached at one edge to the mechanism plate 100. This alternative has the virtue of reducing the mass of the armatures and thereby producing an actuator with a faster response time.

When a source of electrical current is connected to conductors 113 and 107, and current is caused to flow counterclockwise in coils 128 and 126, and clockwise in coils 128' and 126', the forces generated on the coils due to the currents flowing in the magnetic fields produced by permanent magnets 148 and 150 cause armatures 116 to pivot in a clockwise direction, and armature 116' to pivot in a counterclockwise direction, thereby moving blades 118 and 118' to uncover aperture 102.

The forces on the armatures 116 and 116' of the actuator are proportional to the current flowing in the coils. The position of the actuator, and hence the extent to which the aperture 102 is uncovered by blades 118 and 118', is controlled by the control circuit shown in FIG. 2 by controlling the amount of current supplied to the actuator.

Figure 2:
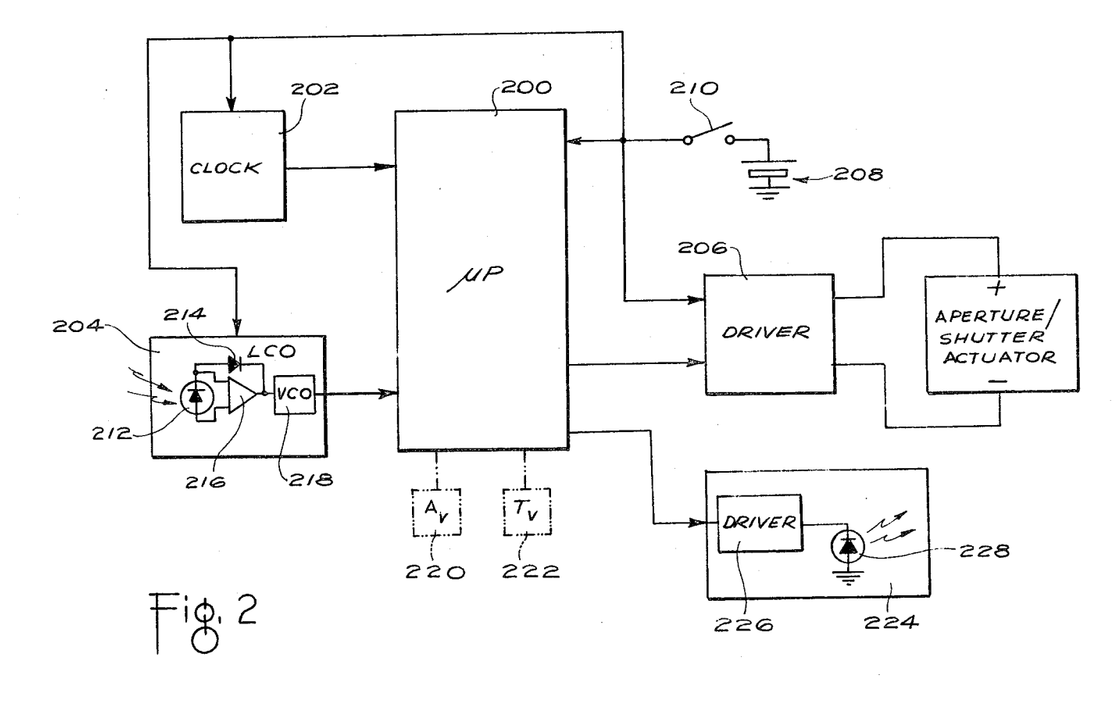
FIG. 2 is a schematic block diagram of the control circuit of the integrated electromechanical camera control mechanism according to the present invention.

The control circuit comprises a microprocessor 200, a reference oscillator 202, a light controlled oscillator 204, an output driver 206, a power supply 208, an actuator switch 210, and a low light indicator circuit 224. The light controlled oscillator 204 includes a photosensitive element such as a photodiode 212, a logarithmic feedback diode 214, an operational amplifier 216, and a voltage controlled oscillator 218. The photodiode, operational amplifier, and feedback diode are responsive to scene light to produce a voltage proportional to the log of the intensity of the scene light. The voltage is applied to the voltage controlled oscillator to produce a pulse train having a repetition frequency proportional to the log of the intensity of scene light. The low light indicator circuit 224 includes a driver circuit 226 and an LED 228.

In operation, when switch 210 is closed by the operator of the camera, power is supplied from power supply 208 to the rest of the control circuit. The reference oscillator 202 starts to produce clock pulses used to time the operations of the microprocessor, the microprocessor 200 is initialized, and the light controlled oscillator 204 starts to produce the pulse train having a frequency proportional to the log of scene light. The microprocessor 200 is programmed to sample the output of the light controlled oscillator 204 for a predetermined time interval, counting the number of pulses received during the time interval. The final count is proportional to the log of the scene brightness. The microprocessor employs a table look up to retrieve the required control signal to produce the proper aperture and shutter time for the given scene brightness. Preferred means of generating the control signal is described in more detail in copending U.S. patent application Ser. No. 360,281, entitled "Improved Method and Circuit for Controlling an Electromagnetic Actuator in Photographic Apparatus" filed on even date herewith by L. F. Frank. The microprocessor 20 then constructs the control signal from the information retrieved from the table, and applies the control signal to driver 206. Driver 206 buffers the control signal from the microprocessor and applies the signal to the shutter/aperture actuator. The control circuit is easily adapted for total program control, shutter preferred, or aperture preferred operation. If shutter or aperture preferred operation are employed, in addition to measuring the scene light, the microprocessor retrieves desired aperture or shutter settings from manually set inputs indicated in phantom by boxes 220 and 222 in FIG. 2. The microprocessor then uses the manually input aperture or shutter preference to compute or retrieve from a table lockup the proper actuator control signal. The microprocessor is easily programmed to override any manual input that would result in improper exposure.

If the ambient light level is too low for acceptable exposure, the microprocessor is programmed to activate a low light signal visible in the camera viewfinder. The low light signal is produced by the low light level indicator circuit 224.

Figure 4:
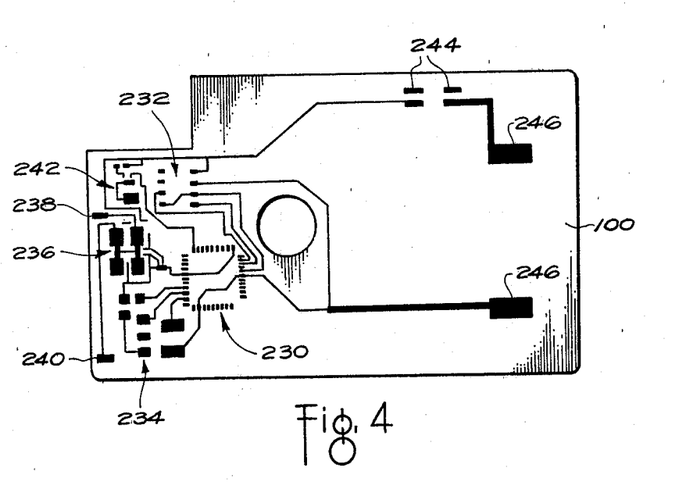
FIG. 4 is a plan view of the conductor pattern printed on the back side of the mechanism plate shown in FIG. 1.

According to the present invention, the control circuit shown in FIG. 2 is fabricated on the mechanism plate 100. FIG. 4 shows the printed conductor pattern on the back of mechanism plate 100 for the control circuit. The conductor pattern includes mounting pads for integrated circuits. Conductors and mounting pads for hybrid circuits are formed directly on the mechanism plate. In the preferred embodiment of the invention, the microprocessor is a single large scale integrated circuit chip such as the Intel 8048 microprocessor. The microprocessor chip is mounted on the square array of mounting pads 230. The light controlled oscillator 204 is also an integrated circuit and is mounted on the rectangular array of mounting pads 232. The clock circuit 202 for the microprocessor is a hybrid circuit constructed on a pattern of conductors 234. Similarly, the drive circuit 206 is a hybrid circuit constructed on a pattern of conductors 236. The output of drive circuit 206 is applied to conductors 238 and 240. The low light level indicator circuit 224 is a hybrid circuit constructed on a pattern of conductors 242. Mounting pads 244 are provided for switch 210, and mounting pads 246 are provided for battery power supply 208.

Figure 5:
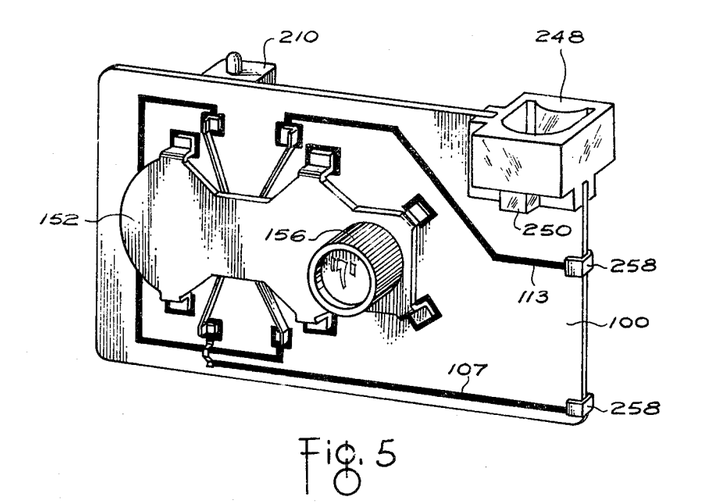
FIG. 5 is a front perspective view of the assembled mechanism according to the present invention.

FIG. 5 is a front perspective view of the assembled integrated electromechanical camera control mechanism according to the present invention. A molded plastic viewfinder unit 248 is supported by the mechanism plate in the upper right hand corner as seen in FIG. 5. The viewfinder unit 248 includes one or more light pipes including a light pipe 250 for conducting light from the front of the camera to the light controlled oscillator circuit 204 mounted on the back of the mechanism plate.

Figure 6:
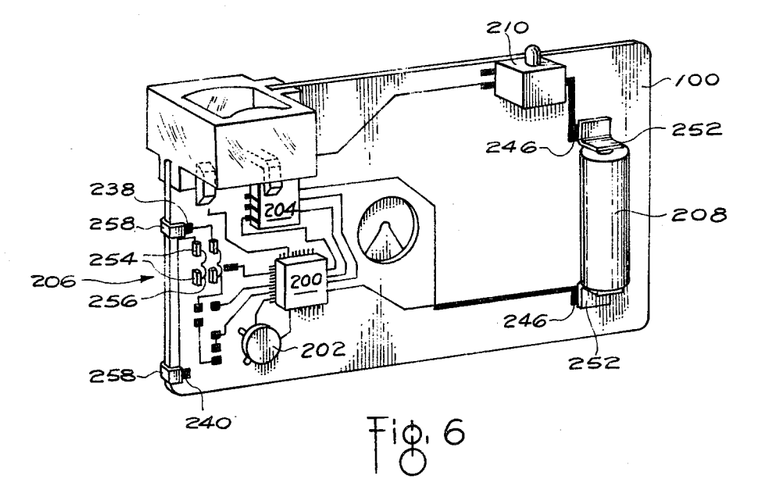
FIG. 6 is a back perspective view of the assembled mechanism according to the present invention.

FIG. 6 is a rear perspective view of the integrated electromechanical camera control mechanism, showing the control circuit on the back of the mechanism plate. As shown in FIG. 6, the power supply 208, comprising a battery, is received in battery holder brackets 252 soldered to mounting pads 246. The integrated circuits comprising microprocessor 200 and light controlled oscillator 204 are shown mounted on their respective mounting pads. Discrete and small scale integrated circuit components comprising the hybrid drive circuit 206 and hybrid clock circuit 202 are also represented. The drive circuit 206 includes four power transistors 254 which are connected to the printed circuit conductors by wire bonds 256. The output conductors 238 and 240 of the drive circuit are connected to conductors 113 and 107 on the front side of mechanism plate 100 by conductive clips 258. After assembly, the hybrid circuits and the microprocessor chip are coated with an epoxy potting compound.

Figure 7:
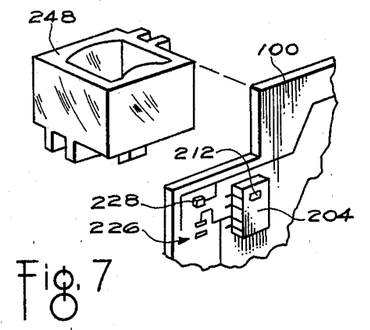
FIG. 7 is a partial perspective view of the viewfinder optics and a portion of the mechanism plate where the optics are mounted.

Turning now to FIG. 7, the light piping optics in the viewfinder unit will be described in more detail. FIG. 7 shows the viewfinder unit 248 removed from the mechanism plate 100 revealing the locations of LED 228 and photodiode 212 in light controlled oscillator circuit 204.

Figure 8:
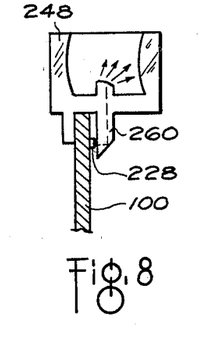
FIG. 8 is a cross-sectional view showing a light pipe for a low light indicator in the viewfinder optics.

FIG. 8 is a cross-sectional view through viewfinder unit 248 and mechanism plate 100 showing the light pipe 260 in viewfinder unit 248 that relays the light from LED 228 into the optical path of the viewfinder optics. The upper end of light pipe 260 as shown in FIG. 8 is frosted so that the light from the LED 228 is emitted diffusely therefrom. Alternatively, a diffuse pattern is created in the end of the light pipe in order to be readable as a word (e.g. LOW for low light) in the view finder.

Figure 9:
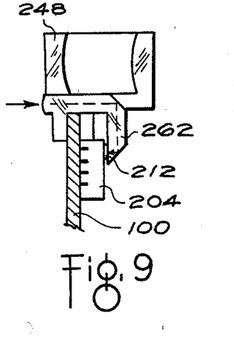
FIG. 9 is a cross-sectional view showing a light pipe in the viewfinder optics for a photodiode in the light controlled oscillator circuit.

FIG. 9 is a cross-sectional view through the viewfinder unit 248 and mechanism plate 100 showing the light pipe 262 that relays scene light to the photodiode 212 in light controlled oscillator 204.

Figure 10:
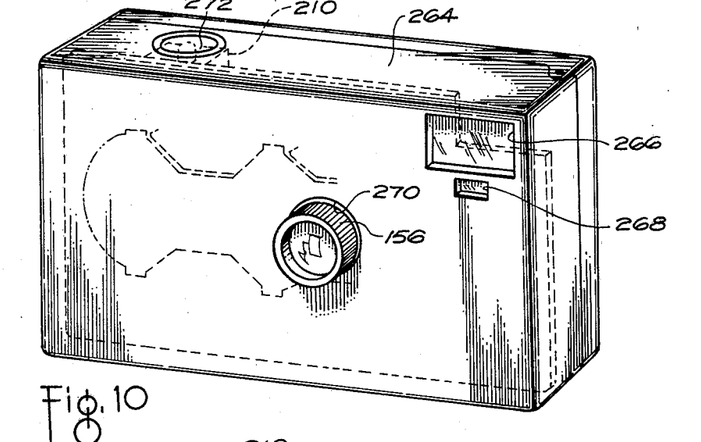
FIG. 10 is a schematic perspective view showing the camera control mechanism according to the present invention (outlined in phantom) in a camera housing.

FIG. 10 is a perspective schematic view showing the camera control mechanism (shown in phantom) in a camera housing 264. The front of the camera housing is provided with apertures 266, 268 and 270 for the viewfinder, for the light pipe for conducting scene light to the light controlled oscillator, and for taking lens 156 respectively. The top of the camera housing is provided with a flexible diaphragm 272 over switch 210 for actuating the camera.

Due to the planar, layered construction of the control mechanism using a maximum of printed circuit manufacturing techniques, automatic assembly of the camera is greatly facilitated. Furthermore, since both the control circuit and the mechanical actuators are formed by printed circuit techniques employing patterned masks, the mechanism is easily designed by adapting the computer automated design CAD and computer automated manufacturing CAM techniques that have been developed for the design and manufacture of integrated circuit electronics. The tooling for most of the camera mechanism comprises patterns that are stored in a computer and can be quickly and easily updated or changed for new camera lines. The use of hard tooling such as molds used to form the camera body and viewfinder optics is reduced to a minimum, thereby reducing the overall cost of tooling for a new camera line.

Figure 11:
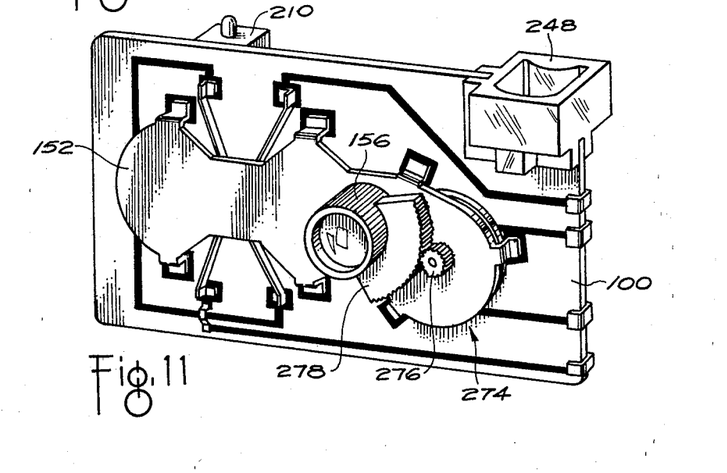
FIG. 11 is a front perspective view of an alternative embodiment of the integrated electromechanical control mechanism including an integral planar armature focus motor.

In addition to the electromechanical shutter/aperture actuator, other planar electromechanical actuators (for example focus motors or film advance motors) may also be integrated on the mechanism plate 100. FIG. 11 shows a front perspective view of an integrated electromechanical camera control mechanism including a shutter/aperture actuator and a planar rotary focus control motor 274. The focus control motor 274 drives lens 156 via an output gear 276 connected to the rotary armature of the planar focus control motor and a sector gear 278 connected to lens 156. A distance measuring circuit and drive electronics is constructed on mechanism plate 100 in the same manner as the exposure control electronics described above. The planar rotary focus motor is described in more detail in U.S. patent application Ser. No. 364,494 entitled "Electromagnetic Actuator Having a Compliant Armature" filed on even date herewith by J. K. Lee.

The invention has been described in detail with particular reference to certain preferred embodiments thereof, but it will be understood that variations and modifications can be effected within the spirit and scope of the invention.

I claim:

1. In combination with a photographic camera, an integrated electromechanical camera control mechanism, comprising:
   a mechanism plate comprising ferromagnetic material having an electrically insulating coating;
   electrical conductor means printed on said insulating coating;
   a flat magnet mounted over said mechanism plate to form a planar magnetic gap therewith, said mechanism plate providing a flux return path for said magnet;
   electrical components comprising an electrical control circuit mounted on said mechanism plate;
   a planar armature located in said magnetic gap and electrically connected to said control circuit by said printed electrical conductors.

2. The invention claimed in claim 1 wherein said camera control mechanism includes a shutter, and wherein said control circuit comprises a light sensitive circuit for measuring scene light and producing an exposure control signal in response thereto, and said armature comprises a shutter actuator.

3. The invention claimed in claim 1 wherein said camera includes an adjustable focus lens, said control circuit means comprises a distance measuring circuit, and said armature comprises a focus actuator.

4. The invention claimed in claim 1 further comprising second control circuit means and a second armature supported by said mechanism plate.

5. In combination with a photographic camera, an integrated electromechanical camera control mechanism, comprising:
   a mild steel mechanism plate having an electrically insulating coating;
   a control circuit mounted on said mechanism plate, and responsive to an input signal for producing an electrical control current;
   electrically conductive means carried on said insulating coating; and
   an electromechanical actuator comprising permanent magnet means mounted in gap forming relation with said mechanism plate and, an armature comprising a printed conductor pattern on an insulating film substrate, mounted for movement on said mechanism plate in response to said electrical control current, in said magnetic gap, said mechanism plate providing a flux return path for said permanent magnet means, and said armature being electrically connected to said control circuit by said electrical conductive means;

whereby said mechanism plate provides a unitary support for the mechanical and electrical elements of said mechanism, and a magnetic flux return path for the magnet means.

6. The invention claimed in claim 5 wherein said camera includes a shutter, said control circuit means comprises a light sensitive circuit for measuring scene light and producing an exposure control signal in response thereto, and said electromechanical actuator comprises a shutter actuator.

7. The invention claimed in claim 5 wherein said camera includes an adjustable focus lens, said control circuit means comprises a distance measuring circuit, and said electromechanical actuator comprises a focus motor.

8. The invention claimed in claim 5 further comprising second control circuit means and a second electromechanical actuator supported by said mechanism plate.

9. The invention claimed in claim 8 wherein said camera includes a shutter and an adjustable focus lens, said first control circuit means comprising a light sensitive circuit for measuring scene light and producing an exposure control signal in response thereto, said first electromagnetic actuator being a shutter actuator, said second control circuit means being a distance measuring means for producing a focus control signal and said second actuator being a focus actuator.

10. The invention claimed in claim 5 wherein said control circuit means comprises an integrated circuit fabricated on a semi-conductor substrate, and said drive circuit means comprises a thick film hybrid circuit fabricated on said insulating coating.

11. The invention claimed in claim 5 further comprising optical elements mounted on said mechanism plate.

12. The invention claimed in claim 11 wherein said optical elements comprise viewfinder optics.

13. The invention claimed in claim 5 wherein said conductive pattern on said armature is formed by photolithographic techniques.

14. The invention claimed in claim 5 wherein said conductive pattern on said armature is formed by screen printing.

15. The invention claimed in claim 5 wherein said electrical conductors on said mechanism plate are formed by printing conductive inks and firing the inks.

16. The invention claimed in claim 5 further comprising light emitting, and light sensitive photoelectrical transducer means mounted on said mechanism plate.

17. The invention claimed in claim 16 further comprising light pipe means mounted on said mechanism plate for conducting light to and from said photoelectrical transducer means.

18. In combination with a photographic camera, an integrated electronic camera control mechanism comprising:

a mild steel mechanism plate having an electrically insulating coating;

control circuit means responsive to an input signal for producing a control signal;

electrically conductive means carried on said insulating coating;

an electromechanical actuator comprising permanent magnet means mounted in a gap forming relation on said mechanism plate, an armature mounted on said mechanism plate for movement, in response to an electrical current, in said magnetic gap, said mechanism plate providing a flux return path for said permanent magnet means; and drive circuit means electrically connected to said control circuit means and said armature by said electrically conductive means, and responsive to said control signal for producing said electrical current to move said actuator, whereby said mechanism plate provides a mechanical support for the mechanical and electrical elements of the control mechanism and a magnetic flux return path for the permanent magnet means.

19. In combination with a photographic camera, an integrated electromechanical camera control mechanism comprising:

a mild steel mechanism plate having an electrically insulating coating;

light sensitive circuit means responsive to scene light for producing an exposure control signal;

electrically conductive means carried on said insulating coating;

an electromechanical shutter/aperture actuator having an armature mounted on said mechanism plate for movement in response to an electrical current therein, permanent magnet means suspended over said mechanism plate in gap forming relationship, said armature residing in said magnetic gap, said mechanism plate providing a flux return path for said permanent magnet means; and a shutter driver circuit electrically connected to said electrically connected to said light sensitive circuit means and to said armature by said electrically conductive means, said shutter driver circuit being responsive to said exposure control signal for producing said electrical current to move said shutter actuator, whereby said mechanism plate provides a mechanical support for the elements of said camera control mechanism, and a magnetic flux return path for said magnet means.

20. A camera control mechanism having a light sensitive circuit responsive to scene light for producing an exposure control signal; an electromechanical shutter actuator including an armature mounted for movement in response to an electrical current therein, in a magnetic gap formed by a permanent magnet disposed in a gap defining relation with a mild steel pole piece; and a shutter driver circuit electrically connected to said light sensitive circuit means and said electromechanical shutter actuator by electrically conductive means, and responsive to said exposure signal for producing an electrical current to move said shutter actuator, characterized by:

said armature, light sensitive circuit, shutter driver circuit, permanent magnet means, and electrically conductive means being carried by mechanism plate comprising ferromagnetic material and having an insulating coating, said mechanism plate providing a mechanical support for the elements of the camera control mechanism, and a magnetic flux return path for the magnet of said actuator.

21. The invention claimed in claim 20, wherein said ferromagnetic material is mild steel.

* * * * *